(12) United States Patent
Hunsucker

(10) Patent No.: US 10,875,781 B2
(45) Date of Patent: Dec. 29, 2020

(54) PHOSPHORUS PENTAFLUORIDE REACTIONS

(71) Applicant: Gene Lee Hunsucker, Baton Rouge, LA (US)

(72) Inventor: Gene Lee Hunsucker, Baton Rouge, LA (US)

(*) Notice: Subject to any disclaimer, the term of this patent is extended or adjusted under 35 U.S.C. 154(b) by 30 days.

(21) Appl. No.: 15/937,974

(22) Filed: Mar. 28, 2018

(65) Prior Publication Data

US 2019/0300376 A1   Oct. 3, 2019

(51) Int. Cl.
*C01D 15/00* (2006.01)
*C01B 25/10* (2006.01)

(52) U.S. Cl.
CPC .......... *C01D 15/005* (2013.01); *C01B 25/10* (2013.01)

(58) Field of Classification Search
CPC ........ C01B 25/10; C01B 7/191; C01D 15/005
See application file for complete search history.

(56) References Cited

U.S. PATENT DOCUMENTS

| | | |
|---|---|---|
| 3,380,803 A | 4/1968 | Jache et al. |
| 3,654,330 A | 4/1972 | Wiesboeck |
| 5,496,661 A | 3/1996 | Mao |
| 5,866,093 A | 2/1999 | Belt et al. |
| 6,514,474 B1 * | 2/2003 | Kikuyama .......... C01D 15/005 423/301 |
| 6,645,451 B1 * | 11/2003 | Schulz .................. C01B 25/10 423/301 |
| 6,685,904 B1 * | 2/2004 | Buckholtz .............. C01B 25/10 423/300 |
| 8,771,882 B2 | 7/2014 | Sato et al. |
| 8,784,763 B2 | 7/2014 | Luly et al. |
| 2001/1004115 | 11/2001 | Smith et al. |
| 2010/0233057 A1 | 9/2010 | Luly et al. |
| 2011/0189538 A1 * | 8/2011 | Waki .................. C01B 25/10 429/199 |
| 2011/0286905 A1 | 11/2011 | Waki et al. |
| 2015/0155599 A1 * | 6/2015 | Boll .................... C01D 15/005 252/62.2 |

FOREIGN PATENT DOCUMENTS

WO   1995017346 A1   6/1995

OTHER PUBLICATIONS

Andrews et al. "Cocondensation reaction between phosphine and fluorine: matrix infrared 1-16 spectra of difluorophosphorane, difluorophosphine and fluorophosphine." Inorganic Chemistry 283 (Feb. 1, 1989): 494-499. Abstract, p. 495 cot 1 para 3; p. 495 cot 2 para 2; p. 498 col 2 para 5, and Table 1.

Written Opinion and Search Report for PCT/US19/24348 dated Jun. 18, 2019, which is the PCT application associated with this application.

* cited by examiner

*Primary Examiner* — Ngoc-Yen Nguyen
(74) *Attorney, Agent, or Firm* — John B. Edel; Edel Patents LLC

(57) ABSTRACT

Reactions are disclosed in which phosphine and hydrogen fluoride are reacted to produce a phosphorus pentafluoride containing gas according the stoichiometry:

$$PH_3 + 4F_2 \rightarrow PF_5 + 3HF$$

Further reaction using the phosphorus pentafluoride to produce lithium hexafluorophosphate are also disclosed.

15 Claims, 1 Drawing Sheet

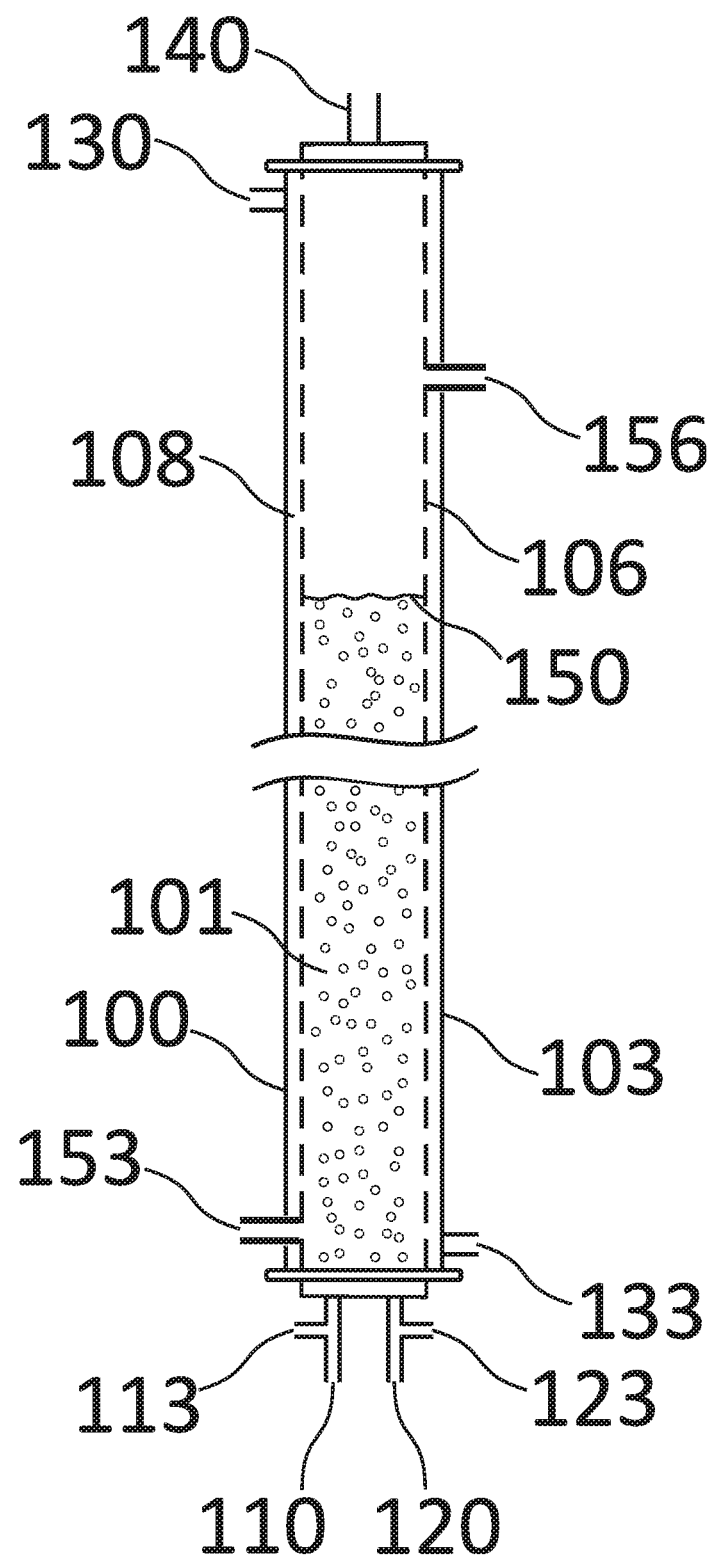

PHOSPHORUS PENTAFLUORIDE REACTIONS

Phosphorus pentafluoride reactions and reactors described herein may be used in the production of Phosphorus pentafluoride and related chemical compositions. Certain phosphorus pentafluoride reactions and reactors disclosed herein may have utility in producing lithium hexafluorophosphate compositions with low contaminant levels.

BRIEF DESCRIPTION OF THE DRAWINGS

FIG. 1 shows a reactor configuration.

DETAILED DESCRIPTION

Example Set 1

Phosphine Preparation

Phosphine, $PH_3$, may be acquired directly for use in the examples described herein. However, commercial phosphine, if available, may have impurities that detrimentally affect later reaction products.

As that phrase is used herein "clean phosphine" is a phosphine composition having less than 50 ppm chlorine (mg/mg) and that is at least 97% phosphine excluding diphosphane ($P_2H_4$) and dilution gases. As that phrase is used herein "crude phosphine" is a phosphine composition that is at least 50% phosphine and does not meet the standard for clean phosphine. "Dilution gas" is used in the context of crude phosphine and in the context of reaction 1, described below, to indicate gases that do not react with phosphine and that do not react with elemental fluorine. Thus, in that context, dilution gases include nitrogen ($N_2$), phosphorus pentafluoride ($PF_5$), hydrogen fluoride, (HF), and noble gases such as helium (He), neon (Ne), argon (Ar) and mixtures thereof. For clarity, examples of clean phosphine and crude phosphine are presented in Table 1 below.

TABLE 1

|  | Example 1 Clean phosphine | Example 2 Crude phosphine | Example 3 Crude phosphine |
| --- | --- | --- | --- |
| phosphine | 82.5% | 82.5% | 45.1% |
| diphosphane | 2.0% | 2.0% | 2.0% |
| methyl-phosphine | 0.5% | 0.5% | 2.9% |
| Nitrogen | 15.0% | 15.0% | 50.0% |
| Chlorine | 10 ppm (mg/mg) | 60 ppm (mg/mg) | 10 ppm (mg/mg) |

Percentages in Table 1 are by weight

Phosphine may be prepared from white phosphorus with sodium or potassium hydroxide or may be prepared by acid-catalyzed disproportioning of white phosphorus among other methods. Phosphine may also be prepared by disproportionation of phosphorous acid or by the hydrolysis of a metal phosphide such as aluminum phosphide or calcium phosphide. Commercial unavailability of phosphine may require phosphine preparation.

Phosphine, whether prepared or purchased may be categorized as crude phosphine or clean phosphine. Significant gains in later phosphorus pentafluoride purity may be significantly enhanced by purifying crude phosphine or clean phosphine to a high purity standard. Such purification may be to the purity standard described above as clean phosphine. Further purification of the phosphine may bring chlorine levels below 50 ppm and in certain cases below 10 ppm. Intensive purification may bring the chlorine levels to below 1 ppm.

The purification of phosphine may take place with an initial filtering of the phosphine. The initial filtering may include microscopic filtration. Cryogenic distillation may be used to purify the phosphine. Also, a cryogenic stepped cooling process may be used to separate phosphine from both higher boiling point and lower boiling point molecules. Further, molecular sieve separation techniques may be used to separate the phosphine from other materials. One or more of the separation techniques may be used and the selection among the separation techniques may be governed by the phosphine production process and an analysis of the particular impurities needing removal.

The use of clean phosphine and the use of phosphine cleaned beyond the clean phosphine standard described above allows for the production of high purity phosphorus pentafluoride ($PF_5$). High purity phosphorus pentafluoride further allows for the manufacture of high purity $LiPF_6$. The presence of chlorine and other impurities in $LiPF_6$ can be detrimental to lithium ion battery life and the methods provided herein may provide significant benefits by limiting such impurities.

Example Set 2

Phosphorus Pentafluoride Production, $PF_5$

Phosphorus pentafluoride, $PF_5$, may be produced by the reaction of Phosphine with gaseous elemental Fluorine according to Equation 1 below.

$$PH_3 + 4F_2 \rightarrow PF_5 + 3HF \quad (Eq. 1)$$

Products of the reaction are phosphorus pentafluoride ($PF_5$) and hydrogen fluoride (HF). The reaction may be conducted on a continuous basis.

Phosphine and Fluorine may be provided at the stoichiometric ratio suggested by Equation 1. Alternatively, either fluorine or phosphine may be provided to a reactor in excess as compared to the stoichiometric ratio suggested by Equation 1.

Reaction conditions for the reaction of Equation 1 may vary over a significant range of temperature and pressure. Because phosphine, fluorine and phosphorus pentafluoride are gases at 20° C. and 14.7 psia there is significant flexibility regarding reaction temperatures. Reaction pressures may be between 5 psia and 400 psia. Reaction temperatures may be between 0° C. and 500° C. Hydrogen fluoride, which boils near ambient temperatures at 14.7 psia, may be used in the reaction to control temperature through the maintenance of a hydrogen fluoride phase change equilibrium inside the reactor. In such cases, the reactor may be maintained at a temperature and pressure that is at or near the boiling point of hydrogen fluoride. In addition to mixed gas-liquid reactors, gas phase only reactors may be used in carrying out the reaction of Equation 1. In certain embodiments, the reactor will operate at an internal temperature below 500° C. In certain related embodiments, the reactor will operate at an internal temperature below 200° C. In certain related embodiments, the reactor will operate at an internal temperature that is within 10° C. of the hydrogen fluoride boiling point for the internal reactor pressure.

For example, the temperature and pressure of a reactor containing liquid hydrogen fluoride may be about 200 psia and 111° C. In a related example, the temperature and pressure of a reactor containing liquid hydrogen fluoride may be about 150 psia and about 93° C. In most examples in which liquid hydrogen fluoride is present in the reactor, the reactor temperature would be below 125° C.

In another example, the reaction of Equation 1 may be carried out entirely in the gas phase and the reactor pressure may be less than 100 psia.

The reaction forming phosphorus pentafluoride may be carried out in Reactor 100 in gas phase which may take the form of a jacketed pipe in pipe reactor. First dilution gas line 113 may join with Phosphine supply line 110 at or near the entrance to Reactor 100. Second dilution gas line 123 may join Fluorine supply line 120 at or near the entrance to Reactor 100. Accordingly, the design of Reactor 100 may provide sufficient dilution gas for the safe reaction of phosphine and elemental fluorine. Reactor 100 may have an Inner pipe 106 separating Reaction space 101 from Cooling annulus 108. Cooling annulus 108 is bound by Reactor outer pipe wall 103 and Inner pipe 106. Liquid coolant introduced through Coolant supply line 130 and discharged through Coolant discharge line 133 allows for the control of reaction temperature. Reaction products are discharged through Product discharge line 140. HF Discharge Line 153 allows for the removal of liquid HF which may be produced during the reaction depending on the reaction conditions and may further remove additional liquid HF that is recycled through Reaction space 101 as a coolant. Cooled HF supply line 156 may supply cooled liquid HF to Reaction space 101 and may be part of reactor temperature control scheme. Refrigeration equipment, a cooling tower and heat exchangers are among the types of equipment that may also be involved in the HF temperature control recycle loop. A Hydrogen fluoride liquid level 150 may be maintained in Reactor 100. That Hydrogen fluoride liquid level 150 may aid in the temperature control of Reactor 100. Phosphine and fluorine may be supplied to Reactor 100 at alternate locations or in additional locations. Reactor 100 may also include internal static mixers or mechanical agitation. Reactor 100 may further take the form of additional reactors arranged in parallel or in series. Reactor 100 may for example have an internal reaction zone which is 20 feet high and two feet wide.

The mixing of dilution gas with the phosphine is optional, but may aid in the control of the reaction. The mixing of dilution gas with the fluorine is also optional for similar reasons.

Cooled HF supply line 156 may be provided for the reactor in cases in which the reactor design includes an HF Recycle loop. HF recycle loops may be used in cases where liquid HF is used as a part of the reactor temperature control. In such cases, the hydrogen fluoride may be cooled, condensed or both before returning the hydrogen fluoride to the reactor. Similarly, one or more carrier gasses that may be regarded as dilution gases in the context of Reaction 1 may be recycled back into the reactor for temperature control, control of the reaction rate or otherwise.

A large variety of reactor sizes and shapes may be used. Reaction conditions may be such that a large fraction of the reactor is liquid filled or the reactor operate entirely gas phase. The reactor may also operate under conditions in which large quantities of HF are converted from the liquid phase to the gaseous phase. Such phase changes may be part of the reactor temperature control scheme.

The reaction products discharged through Product discharge line 140 may then be separated. For example, the products may be separated cryogenically. In further examples, the product stream may be compressed, then cooled in a multi-step process to selectively remove individual components or the product stream may be separated via staged cryogenic cooling at lower pressures. Dilution gases introduced into the reactor or produced in the reactor may be separated from the phosphorus pentafluoride prior to final processing. In certain examples, the carrier gas can be recycled back into the reactor.

The reaction of Equation 1 may be practiced in a reactor like the reactor depicted in FIG. 1 without a liquid level of hydrogen fluoride. In such cases, a dilution gas may be used to control the reaction conditions inside of Reactor 100. The dilution carrier gas may also aid in the mixing and flow of reactants in the reactor, facilitate the flow of phosphorus pentafluoride product out of the reactor and assist with the dissipation of heat from the exothermic reaction between the phosphine and fluorine.

The Fluorine feed stream and phosphine stream may be introduced at a single location such as depicted in FIG. 1 or they may be introduced at multiple locations into the reactor.

Various reactor designs beyond the design depicted in FIG. 1 may be employed for conducting the reaction according to Equation 1. Such reactors may include varying the size, shape and certain piping configurations for the reactor.

Cooling annulus 108 may be replaced with many other forms of reactor jacketing or be omitted entirely in favor of other techniques suitable for controlling the temperature of the reactor. For example, a jacket may take the form of heat exchanger plates attached to the exterior wall of the reactor. Further, another alternate cooling mechanism may involve the use of a helical coil heat exchange inside the reactor or attached to the exterior wall of the reactor. A suitable fluid for use in the jacket may be determined in conjunction with or following the selection of the reactor operating temperature. In another example, the jacket may be omitted, and a hydrogen fluoride heat exchange loop may be used as a means of controlling reactor temperature.

Example Set 3

$LiPF_6$

Lithium hexafluorophosphate, $LiPF_6$ may be prepared according to the generalized reaction of Equation 2 below.

$$PF_5 + LiF \rightarrow LiPF_6 \quad \text{(Eq. 2)}$$

The reaction of Equation 2 may be carried out in a hydrogen fluoride solution. Phosphorus pentafluoride prepared by the methods disclosed herein may be used in the reaction of Equation 2. That phosphorus pentafluoride may have any of the various levels of purity produced by the reactions associated with Equation 1 described herein. The higher purity phosphine described above may result in higher purity phosphorus pentafluoride which would in turn lead to higher purity lithium hexafluorophosphate. The higher purity lithium hexafluorophosphate may have significant utility in the electronics industry and may be useful as an electrolyte in lithium ion batteries. Other reactions converting phosphorus pentafluoride into lithium hexafluorophosphate may used.

Reaction processes described herein may, for example, comprise supplying a quantity of $PH_3$ to a reactor; supplying a quantity of $F_2$ to the reactor and reacting the quantity of $F_2$ with the quantity of $PH_3$ thereby producing a first reaction product gas comprising a quantity of $PF_5$ according to the stoichiometry $PH_3 + 4F_2 \rightarrow PF_5 + 3HF$; such that among gas phase constituents in the reactor a $PH_3$ concentration exceeds 0.5% (mg/mg). In a related example, the reacting of the quantity of $F_2$ with the quantity of $PH_3$ may be done in the presence of hydrogen fluoride. In a related example, the reacting of the quantity of $F_2$ with the quantity of $PH_3$ may be done in the presence of liquid hydrogen fluoride. In a related example, among the gas phase constituents in the reactor a $F_2$ concentration may exceed 0.5% (mg/mg). In a related example, the reaction process may further comprise condensing a quantity of HF into the liquid phase. In a related example, the reactor may contain less than 1% water (mg/mg). In a related example, the quantity of $PH_3$ supplied to the reactor may be part of a first source gas and the first source gas may be less than 50 ppm chlorine (mg/mg). In a related example, the quantity of $F_2$ supplied to the reactor may be part of a second source gas and the second source gas may be less than 50 ppm chlorine (mg/mg). In a related example, the first reaction product gas may be less than 50 ppm chlorine (mg/mg). In a related example, the reaction process may further comprise the step of cooling HF. In a related example, the reaction process may further comprise reacting the quantity of $PF_5$ according to the stoichiometry $PF_5+LiF\rightarrow LiPF_6$. In a related example, the reaction process may further comprise reacting the quantity of $PF_5$ according to the stoichiometry $PF_5+LiF\rightarrow LiPF_6$ such that the reacting of the quantity of $PF_5$ is done in the presence of HF. In a related example, the reaction process may further comprise reacting the quantity of $PF_5$ according to the stoichiometry $PF_5+LiF\rightarrow LiPF_6$ wherein a $LiPF_6$ product is produced and the $LiPF_6$ product is less than 50 ppm chlorine (mg/mg). In a related example, the reaction process may further comprise reacting the quantity of $PF_5$ according to the stoichiometry $PF_5+LiF\rightarrow LiPF_6$ wherein a $LiPF_6$ product is produced and the $LiPF_6$ product has less than 1 ppm chlorine (mg/mg). In a related example, the reaction process may further comprise the step of cryogenically separating the quantity of $PF_5$ from the first reaction product gas. In a further related example, the reaction process may further comprise condensing a quantity of HF into the liquid phase; may include cooling HF; may be conducted such that the reacting of the quantity of $F_2$ with the quantity of $PH_3$ is done in the presence of liquid hydrogen fluoride; may be conducted such that among the gas phase constituents in the reactor a $F_2$ concentration exceeds 0.5% (mg/mg); may be conducted such that the reactor contains less than 1% water (mg/mg); may be conducted such that the quantity of $PH_3$ supplied to the reactor is part of a first source gas and the first source gas is less than 50 ppm chlorine (mg/mg); may be conducted such that the quantity of $F_2$ supplied to the reactor is part of a second source gas and the second source gas is less than 50 ppm chlorine (mg/mg); may be conducted such that the first reaction product gas is less than 50 ppm chlorine (mg/mg); may be conducted such that the reacting of the quantity of $PF_5$ is done in the presence of HF; may include the step of cryogenically separating the quantity of $PF_5$ from the first reaction product gas; may include the step of reacting the quantity of $PF_5$ according to the stoichiometry $PF_5+LiF\rightarrow LiPF_6$ and may be conducted such that a $LiPF_6$ product is produced and the $LiPF_6$ product is less than 50 ppm chlorine (mg/mg).

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

I claim:
1. A reaction process comprising:
   a. purifying a first quantity of $PH_3$ by a method selected from filtration, cryogenic separation and molecular sieving thereby creating a purified $PH_3$;
   b. supplying a quantity of the purified $PH_3$ to a reactor;
   c. supplying a quantity of $F_2$ to the reactor and
   d. reacting the quantity of $F_2$ with the quantity of the purified $PH_3$ thereby producing a first reaction product gas comprising a quantity of $PF_5$ according to the stoichiometry

$PH_3+4F_2\rightarrow PF_5+3HF$.

2. The reaction process of claim 1 wherein the reacting of the quantity of $F_2$ with the quantity of the purified $PH_3$ is done in the presence of hydrogen fluoride.
3. The reaction process of claim 1 wherein the reacting of the quantity of $F_2$ with the quantity of the purified $PH_3$ is done in the presence of liquid hydrogen fluoride.
4. The reaction process of claim 1 further comprising condensing a quantity of HF into the liquid phase.
5. The reaction process of claim 1 wherein the reactor contains less than 1 percent water by weight.
6. The reaction process of claim 1 wherein the quantity of the purified $PH_3$ supplied to the reactor is part of a first source gas and the first source gas is less than 50 ppm chlorine by weight.
7. The reaction process of claim 1 wherein the quantity of $F_2$ supplied to the reactor is part of a second source gas and the second source gas is less than 50 ppm chlorine by weight.
8. The reaction process of claim 1 wherein the first reaction product gas is less than 50 ppm chlorine by weight.
9. The reaction process of claim 1 further comprising the step of cooling HF.
10. The reaction process of claim 1 further comprising reacting the quantity of $PF_5$ according to the stoichiometry $PF_5+LiF\rightarrow LiPF_6$.

11. The reaction process of claim 1 further comprising reacting the quantity of $PF_5$ according to the stoichiometry $PF_5+LiF\rightarrow LiPF_6$ wherein the reacting of the quantity of $PF_5$ is done in the presence of HF.
12. The reaction process of claim 1 further comprising reacting the quantity of $PF_5$ according to the stoichiometry $PF_5+LiF\rightarrow LiPF_6$ wherein a $LiPF_6$ product is produced and the $LiPF_6$ product is less than 50 ppm chlorine by weight.
13. The reaction process of claim 1 further comprising reacting the quantity of $PF_5$ according to the stoichiometry $PF_5+LiF\rightarrow LiPF_6$ wherein a $LiPF_6$ product is produced and the $LiPF_6$ product is less than 1 ppm chlorine by weight.
14. The reaction process of claim 1 further comprising the step of cryogenically separating the quantity of $PF_5$ from the first reaction product gas.
15. The reaction process of claim 1
   a. further comprising condensing a quantity of HF into the liquid phase;
   b. further comprising the step of cooling HF;
   c. wherein the reacting of the quantity of $F_2$ with the quantity of the purified $PH_3$ is done in the presence of liquid hydrogen fluoride;
   d. wherein the reactor contains less than 1 percent water by weight;

e. wherein the quantity of the purified $PH_3$ supplied to the reactor is part of a first source gas and the first source gas is less than 50 ppm chlorine by weight;
f. wherein the quantity of $F_2$ supplied to the reactor is part of a second source gas and the second source gas is less than 50 ppm chlorine by weight;
g. wherein the first reaction product gas is less than 50 ppm chlorine by weight;
h. further comprising the step of cryogenically separating the quantity of $PF_5$ from the first reaction product gas;
i. further comprising reacting the quantity of $PF_5$ according to the stoichiometry $$PF_5 + LiF \rightarrow LiPF_6;$$

j. wherein the reacting of the quantity of PF5 is done in the presence of HF and
k. wherein a $LiPF_6$ product is produced and the $LiPF_6$ product is less than 50 ppm chlorine by weight.

* * * * *